United States Patent
Ausserlechner et al.

(10) Patent No.: US 10,481,032 B2
(45) Date of Patent: *Nov. 19, 2019

(54) STRESS COMPENSATION SYSTEMS AND METHODS IN SENSORS

(71) Applicant: Infineon Technologies AG, Neubiberg OT (DE)

(72) Inventors: Udo Ausserlechner, Villach (AT); Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 418 days.

This patent is subject to a terminal disclaimer.

(21) Appl. No.: 15/232,432

(22) Filed: Aug. 9, 2016

(65) Prior Publication Data

US 2016/0349136 A1 Dec. 1, 2016

Related U.S. Application Data

(63) Continuation-in-part of application No. 13/540,081, filed on Jul. 2, 2012, now Pat. No. 9,410,820.

(51) Int. Cl.
*G01L 27/00* (2006.01)
*G01L 1/00* (2006.01)
*G01D 3/02* (2006.01)

(52) U.S. Cl.
CPC .............. *G01L 27/00* (2013.01); *G01D 3/021* (2013.01); *G01L 1/00* (2013.01)

(58) Field of Classification Search
CPC ................................ G01L 27/00; G01L 1/00
See application file for complete search history.

(56) References Cited

U.S. PATENT DOCUMENTS

| | | | |
|---|---|---|---|
| 7,302,357 B2 | 11/2007 | Ausserlechner |
| 7,889,030 B2 | 2/2011 | Schoen et al. |
| 2005/0162160 A1 | 7/2005 | Ausserlechner |
| 2009/0108839 A1 | 4/2009 | Ausserlechner |
| 2013/0241540 A1 | 9/2013 | Ausserlechner |
| 2013/0314075 A1 | 11/2013 | Ausserlechner et al. |
| 2014/0210458 A1 | 7/2014 | Ausserlechner |

OTHER PUBLICATIONS

U.S. Appl. No. 13/540,081, filed Jul. 2, 2012, Udo Ausserlechner et al.

*Primary Examiner* — Lisa M Caputo
*Assistant Examiner* — Jamel E Williams
(74) *Attorney, Agent, or Firm* — Schiff Hardin LLP

(57) ABSTRACT

Embodiments relate to stress compensation in differential sensors. In an embodiment, instead of compensating for stress on each sensor element independently, stress compensation circuitry aims to remove stress-related mismatch between two sensor elements using the sensor elements themselves to detect the mismatch. A circuit can be implemented in embodiments to detect mechanical stress-related mismatch between sensor elements using the sensor elements, and tune the output signal by a compensation factor to eliminate the mismatch. Embodiments are therefore less complicated and less expensive than conventional approaches. While embodiments have applicability to virtually any differential sensor, including magnetic field, pressure, temperature, current and speed, an example embodiment discussed herein relates to magnetic field.

20 Claims, 2 Drawing Sheets

Difference-stress compensated total signal Uh1 − (S1/S2)*Uh2

STRESS COMPENSATION SYSTEMS AND METHODS IN SENSORS

TECHNICAL FIELD

The invention relates generally to differential sensors and more particularly to compensating for stresses in differential sensors.

BACKGROUND

Differential sensors typically comprise at least two sensor elements positioned at two different locations on a substrate or in a package. Signals at the at least two sensor elements are subtracted to obtain a differential signal, or the difference between what is sensed at each sensor element. Examples of differential sensors include differential magnetic current sensors, differential wheel speed sensors, differential pressure sensors, and differential temperature sensors, among others.

Differential sensor output signals depend primarily on the physical quantity to be measured. For example, a differential Hall sensor responds to magnetic fields while a differential pressure sensor responds to pressure, etc. The change in the output signal versus a small change of input physical quantity is referred to as the sensor sensitivity (e.g., magnetic sensitivity, pressure sensitivity, etc.). This sensitivity also depends on mechanical stresses that act on the sensor elements. These stresses often relate to sensor package assembly, where various components with different coefficients of thermal expansion are joined together. These stresses can affect the various sensor elements unevenly, leading to inaccuracies and errors in the sensor output signal.

Conventional approaches include using special low-stress packages, with low-stress die attach and mold compound, and ceramic instead of plastic packaging, or attempting to compensate for the stress in each sensor element individually. These approaches, however, are inefficient, complicated and expensive, leading to higher sensor costs.

Therefore, there is a need for improved stress compensation in differential sensors.

SUMMARY

Embodiments relate to stress compensation in differential sensors. In an embodiment, a differential sensor system comprises at least two sensor elements configured to sense a first characteristic; compensation circuitry coupled to the at least two sensor elements to use the at least two sensor elements to sense a second mechanical stress characteristic affecting the at least two sensor elements and configured to determine a compensation factor that is a function of a difference in mechanical stress between the at least two sensor elements; and a sensor system output configured to provide an output signal that is a difference between the outputs of the at least two sensor elements adjusted by the compensation factor.

In an embodiment, a stress compensation method for a differential sensor comprises determining a compensation factor that is a function of a difference in stress between at least two sensor elements of the differential sensor, wherein the at least two sensor elements are used to detect the difference in stress; and compensating for a stress sensitivity mismatch between the at least two sensor elements by adjusting a difference in output signals of the at least two sensor elements by the compensation factor.

In an embodiment, a sensor arrangement comprises a first sensor and a second sensor each sensing a first characteristic; a circuit coupled to the first sensor and the second sensor and configured to determine a first value of an operation parameter corresponding to the first sensor and a second value of the operation parameter corresponding to the second sensor; and a compensation circuit coupled to the first sensor, second sensor and circuit and configured to compensate a combined signal of the sensed first characteristic from the first sensor and the second sensor for an influence related to mechanical stress, wherein the compensation circuit is configured to determine a stress compensation based on the first value and the second value of the operation parameter.

In an embodiment, a differential sensor comprises a first sensor configured to provide a first signal indicating a first characteristic at a first location of a substrate; a second sensor configured to provide a second signal indicating the first characteristic at a second location of the substrate; a circuit configured to provide a combination of the first and second signals and including at least one element configured to manipulate a weight of at least one of the first and second signals in the combination of the first and second signals; and a compensation circuit configured to compensate for a mechanical stress by manipulating the weight of at least one of the first and second signals in the combination of the first and second signals.

BRIEF DESCRIPTION OF THE DRAWINGS

The invention may be more completely understood in consideration of the following detailed description of various embodiments of the invention in connection with the accompanying drawings, in which.

Figure 1:
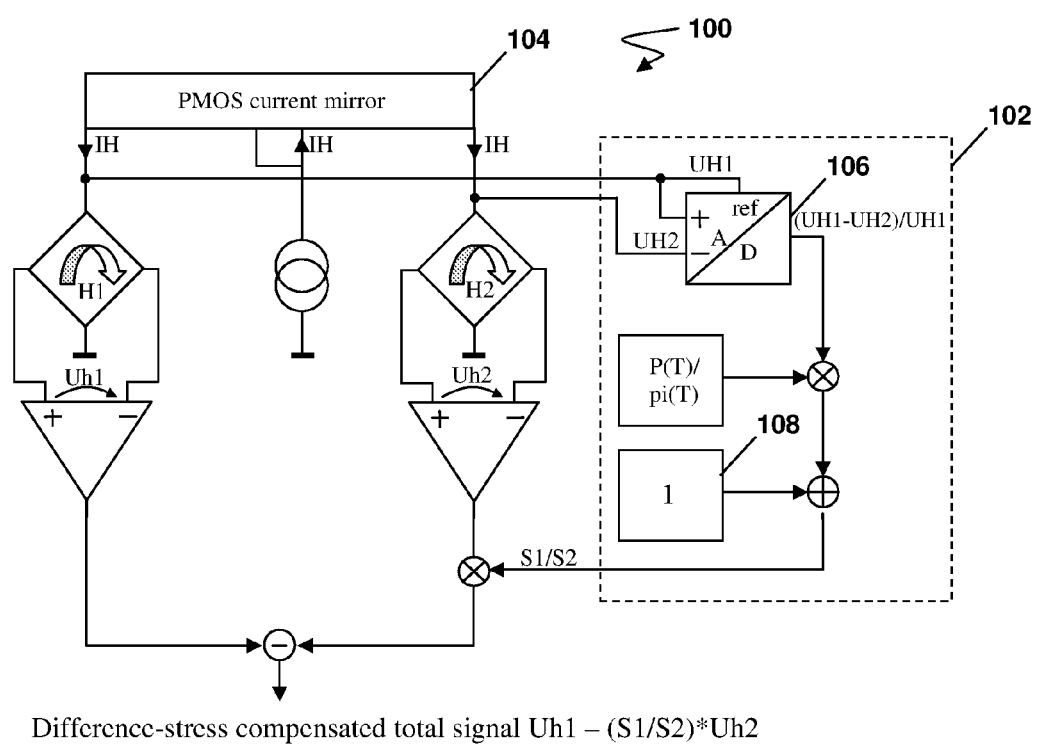
FIG. 1 is a block circuit flow diagram of a differential stress sensing and compensation system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to stress compensation in differential sensors. In an embodiment, instead of compensating for stress on each sensor element independently, stress compensation circuitry aims to remove stress-related mismatch between two sensor elements using the sensor elements themselves to detect the mismatch. A circuit can be implemented in embodiments to detect mechanical stress-related mismatch between sensor elements using the sensor elements, and to tune or manipulate the output signal by a compensation factor to eliminate the mismatch. Embodiments are therefore less complicated and less expensive than conventional approaches, such as conventional approaches utilizing additional separate elements to sense the mechanical stress in addition to the sensor elements. Embodiments described herein can provide mechanical stress compensation without such additional sensor elements for sensing the mechanical stress itself. While embodiments have applicability to virtually any differential sensor, including magnetic field, pressure, temperature, current and speed, an example embodiment discussed herein relates to magnetic field.

Referring to FIG. 1, a flow diagram of a circuit 100 comprising two Hall effect sensor elements H1 and H2 and differential stress compensation circuitry 102 is depicted. Circuit 100 also comprises, in an embodiment, a current mirror 104, which doubles the current and injects it into sensor elements H1 and H2.

In an embodiment, sensor elements H1 and H2 are positioned two different locations spaced apart from one another, as is typical in differential stress sensors. In embodiments, sensor elements H1 and H2 can be on the same or different dies, in the same or different packages. The arrows with sensor elements H1 and H2 illustrate that, typically but not necessarily, the Hall plates are operated in a spinning current mode in order to remove their offsets.

If operated in a spinning current mode, sensor elements H1 and H2 can be operated in synchronous spinning current clock phases in embodiments. For example, sensor element H1 can have a first current flow direction in a first clock cycle and a second current flow direction in a second clock cycle; sensor element H2 can then also have a first current flow direction in a first clock cycle and a second current flow direction in a second clock cycle. In another embodiment, however, this can be reversed such that sensor element H2 has a second current flow direction in a first clock cycle and first current flow direction in a second clock cycle. Moreover, the current flow directions in sensor elements H1 and H2 can be different, such that in sensor element H1 the current can flow at 0, 90, 180 and 270 degrees with respect to a reference direction in four clock phases of a spinning current scheme, while in sensor element H2 the current can flow at 45, 135, 225 and 315 degrees. Additionally, the current can be rotated clockwise in sensor element H1 and counter-clockwise in sensor element H2, yet it can also jump stochastically, with a pseudo-random sequence, between different directions.

Sensor elements H1 and H2 are supplied by the same current IH, which results in two different supply voltages, UH1 at sensor element H1 and UH2 at sensor element H2:

$$UH1=IH*Ri1, \text{ where } Ri1=Ri0(T)*(1+pi(T)*\text{sigma1})$$

$$UH2=IH*Ri2, \text{ where } Ri2=Ri0(T)*(1+pi(T)*\text{sigma2})$$

where Ri0(T) is a function of temperature, pi(T) is a temperature-dependent piezo-resistive coefficient, and sigma1 and sigma2 are the mechanical stresses on sensor elements H1 and H2, respectively. In an embodiment, sigma=sigXX+sigYY, wherein sigXX and sigYY are the in-plane (i.e., parallel to the die surface) normal stress components. Stress components sigma1 and sigma2, however, can be any function of stress components and are not limited to only the sum of in-plane normal stress components. Generally, however, the resistances of sensor elements H1 and H2 and the sensitivities depend on the same function of stress components. In embodiments, circuitry 102 comprises an explicit or implicit temperature sensor for pi(T) and P(T) discussed below.

Each sensor element H1 and H2 has an output signal:

$$Uh1=S1*B1$$

$$Uh2=S2*B2$$

where S1 and S2 are the magnetic sensitivities of sensor elements H1 and H2, respectively, and the B1 and B2 are the magnetic field components perpendicular to the die surface. Magnetic sensitivities S1 and S2 can be expressed as:

$$S1=IH*Si0(T)*(1+P(T)*\text{sigma1})$$

$$S2=IH*Si0(T)*(1+P(T)*\text{sigma2})$$

where Si0(T) is the current-related magnetic sensitivity versus temperature at zero mechanical stress, and P(T) is a temperature-dependent piezo-Hall coefficient.

Circuitry 102 measures the difference in supply voltages of sensor elements H1 and H2, UH1−UH2/UH1, which is approximately equal to pi*(sigma1−sigma 2). Dividing the difference, here by UH1, uses UH1 as a reference value. If circuitry 102 is instead coupled to the output of the amplifier of sensor element H1, UH2 is used as the reference value. Next, circuitry 102 calculates a ratio of the sensitivities, referred to as a compensation factor, S1/S2:

$$S1/S2=(1+P*\text{sigma1})/(1+P*\text{sigma2})\sim 1+P*(\text{sigma1}-\text{sigma2})$$

which provides $$S1/S2\sim 1+P*(UH1-UH2)/(UH1*pi).$$

In embodiments, P can comprise a piezo-Hall coefficient. While the compensation factor is expressed here as S1/S2, another factor or characteristic can be used in other embodiments. Moreover, signal components from H1 and H2 can be otherwise combined and/or weighted. For example, in embodiments a weight of at least one of the signals related to H1 or H2 can be manipulated by circuitry when combined, such as when combined to determine the compensation factor or when compensating for mechanical stress by the combined signal compensation factor.

Finally, circuitry 102 determines the stress compensated total signal:

$$Uh1-(S1/S2)*Uh2=S1*B1-(S1/S2)*S2*B2=S1*(B1-B2)$$

Circuit 100 and circuitry 102 can be versatile according to desired embodiments. For example, the signals can be provided as analog voltages or currents, digital signals, numbers, time-continuous or time-discrete signals (e.g., switched capacitor implementation). Moreover, circuit 100 and circuitry 102 can comprise a variety of forms different from that depicted in FIG. 1. Additionally, instead of multiplying the output of the amplifier of sensor element H2 by the compensation factor S1/S2, the supply current of sensor element H2 can be manipulated by the same compensation factor, S1/S2. Alternatively, it also is possible to introduce clock phases and average samples of the signals in various clock phases. For example, if a time average of the signals is computed (e.g., over an entire spinning current clock cycle), one can scale the length of individual clock phases by S1/S2, which effectively multiplies the signal in this phase by S1/S2. Such a time average can be achieved by an analog or digital low-pass filter 110 (see FIG. 2) with suitable corner frequency, with or without a reset at each spinning current cycle, as a switched-capacitor equivalent, or as a sample and hold equivalent circuit.

Figure 2:
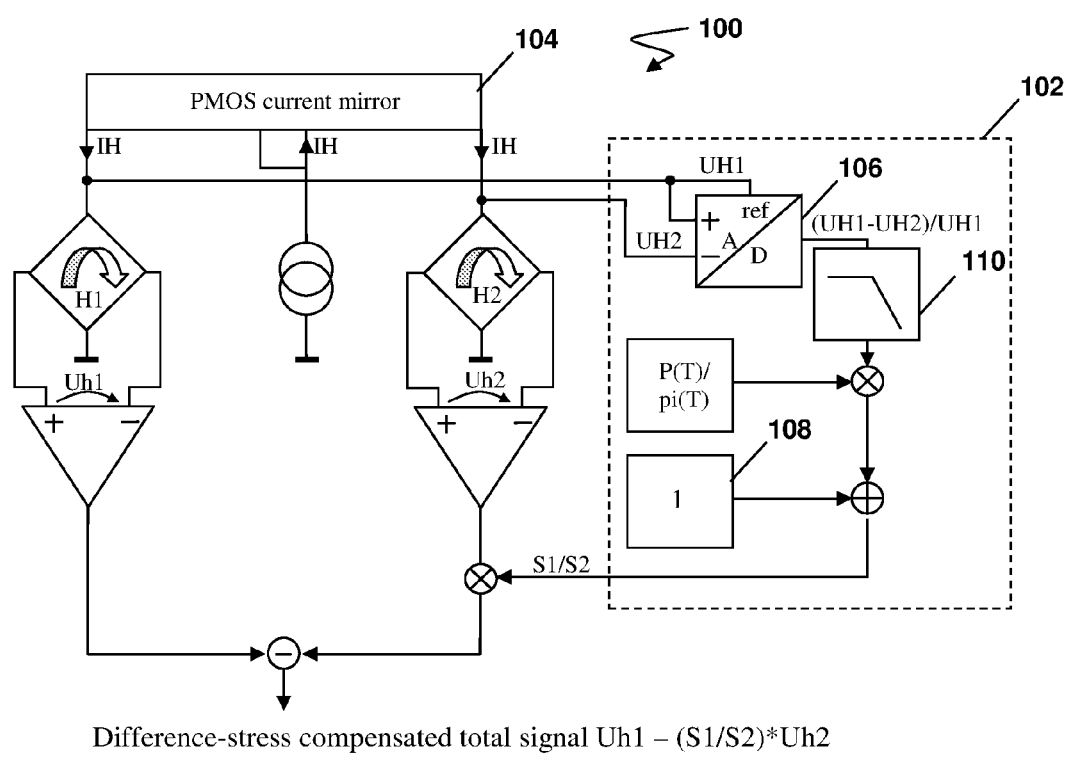
FIG. 2 is a block circuit flow diagram of a differential stress sensing and compensation system according to an embodiment.

Referring to FIG. 2, low-pass filter 110 can compute a time average over several clock phases of the spinning code mode and is optional in embodiments. The internal resistances of sensor elements H1 and H2 can have different stress dependencies in different directions of current flow. Therefore, it can be advantageous in embodiments to average the signals over all direction of current flow so that the averages stress dependence of the internal resistance is similar to the stress dependence of the magnetic sensitivity (i.e., in that it depends on the same combination of components of the stress tensor). This is true for ordinary hall plates but can be different for vertical Hall devices such that, depending on the type of Hall device and its stress dependence of resistance and sensitivity, low-pass filter 110 can be adjusted or even omitted in embodiments. The particular placement of low-pass filter 110 in circuit 100 is but one example, and it can be otherwise arranged in embodiments according to the rules of signal theory.

The compensation factor S1/S2 of the compensation system can be computed continuously during operation of the sensor or it can work occasionally (e.g., upon start-up) or intermittently (e.g., once per second). In the latter case, a multiplexed A/D converter 106 can be used, which is also shared with other tasks of the signal processing algorithm. It is also possible to determine the compensation factor once after packaging of the sensor, programming it into a memory. This can be suitable in embodiments if the lifetime drift of mechanical stress is expected to be low.

Additionally, in embodiments, sensor elements H1 and H2 can be supplied by either supply voltages or supply currents.

If sensor elements H1 and H2 are supplied by current, the compensation factor S1/S2 is derived from the supply voltage of each sensor element. In an embodiment, the current supplied to the sensor elements H1 and H2 has the same or substantially the same value. The supply voltage of the sensor element H1 can be derived by tapping a voltage difference caused by the supply current flowing through sensor element H1, and the supply voltage can be derived by tapping a voltage difference caused by the supply current flowing through the sensor element H2.

If the supply is voltage, the compensation factor S1/S2 is derived from the supply current of each sensor element. In an embodiment, the voltage supplied to the sensor elements H1 and H2 has the same or substantially the same value. The supply current of the sensor element H1 can be derived by sensing the supply current flowing through the sensor element H1, and the supply current of the sensor element H2 can be derived by sensing the supply current flowing through the sensor element H2. It is also possible to couple the sensor elements H1 and H2 to subtract their output voltages. In such an embodiment, only a single amplifier is used, and it can be advantageous to scale the supply current or voltage of H2 by S1/S2.

Further, embodiments assume that the matching between the sensitivities of both sensor elements H1 and H2 is perfect in the absence of stress. If there is some initial mismatch even at zero stress (e.g., on wafer level before packaging assembly), a constant term can be added to "1" 108 in the signal flow to account for the mismatch.

In an example embodiment, sensor elements H1 and H2 are spaced far apart, e.g. in different packages. In such a configuration, sensor elements H1 and H2 can experience different temperatures, and it would be desirable for the system to account for this. In such a case, each sensor element H1 and H2 can have its own temperature sensor, T1 and T2, respectively. Then:

$$UH1=IH*Ri1(T1)$$

where $$Ri1=Ri0(T1)*(1+pi(T1)*sigma1)$$

and $$UH2=IH*Ri2(T2)$$

where $$Ri2=Ri0(T2)*(1+pi(T2)*sigma2).$$

The system computes $$(1-UH2*Ri0(T1)/UH1/Ri0(T2))$$

instead of (1−UH2/UH1), and this is approximately equal to pi(T)*(sigma1−sigma2), with T=(T1+T2)/2. The ratio of sensitivities is $$S1/S2 \sim Si0(T1)/Si0(T2)*(1+P(T)*(sigma1-sigma2)).$$

Combining these results gives $$S1/S2 \sim Si0(T1)/Si0(T2)*\{1+P(T)/pi(T)*[1-UH2*Ri0(T1)/UH1/Ri0(T2)]\}.$$

As for other embodiments discussed herein, circuit 100 finally determines $$Uh1-(S1/S2)*Uh2.$$

In the computation of S1/S2, there are two ratios, namely Si0(T1)/Si0(T2) and Ri0(T1)/Ri0(T2), and both depend only on temperature such that these ratios are more or less given functions of temperatures T1 and T2 that do not change much versus process spread. These functions can be implemented in the signal processing part in numerous ways as appreciated by those skilled in the art.

Embodiments can be particularly suited for magnetic field current sensors, such as embodiments thereof having a slotted current rail coupled to a thin sensor die. The different coefficients of thermal expansion of the current rail and die lead to inhomogeneous mechanical stresses. Assembly tolerances generally make it unsuitable or impossible to use the symmetry properties of the stress pattern, and it is also generally not possible to use additional stress sensing devices (e.g., stress resistors) because they experience different stresses than the Hall plates. Thus, embodiments of the invention solve this by using the Hall plates themselves as the stress sensors.

Moreover, embodiments are also applicable to other types of sensors as previously mentioned, making the concept particularly versatile. While the detailed description focuses on magnetic differential systems, concepts taught herein may be applied to other sensor systems. The concepts are applicable to any sensor affected by mechanical stress applied thereto. One example is pressure sensors, or more specifically, differential pressure sensors.

Further, it is known that Hall effect devices can be substituted by equivalent Wheatstone resistor bridges. Therefore it is also possible to replace the Hall effect devices by other kinds of sensors which are resistive bridge circuits, as long as (i) they have an output signal being influenced by mechanical stress, and (ii) a bridge input or output resistance that is responsive to mechanical stress.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A sensor system comprising:
   at least two sensor elements configured to sense a characteristic;
   compensation circuitry coupled to the at least two sensor elements to use the at least two sensor elements to sense a mechanical stress affecting the at least two sensor elements and configured to determine a compensation factor that is a function of a difference in mechanical stress between the at least two sensor elements; and
   a sensor system output configured to provide an output signal that is a difference between the outputs of the at least two sensor elements adjusted by the compensation factor.

2. The sensor system of claim 1, wherein the compensation factor substantially eliminates a sensitivity mismatch between the at least two sensor elements caused by mechanical stress on the at least two sensor elements.

3. The sensor system of claim 1, wherein the difference in mechanical stress between the at least two sensor elements is estimated from a difference in supply voltages of the at least two sensor elements.

4. The sensor system of claim 1, wherein the difference in mechanical stress between the at least two sensor elements is estimated from a difference in supply currents of the at least two sensor elements.

5. The sensor system of claim 1, further comprising a die, wherein the at least two sensor elements are positioned spaced apart on the die.

6. The sensor system of claim 1, further comprising first and second dies, wherein a first of the at least two sensor elements is positioned on the first die and a second of the at least two sensor elements is positioned on the second die.

7. The sensor system of claim 1, wherein the compensation circuitry comprises an analog-to-digital (A/D) converter.

8. The sensor system of claim 1, wherein the compensation circuitry comprises at least one temperature sensor.

9. The sensor system of claim 8, wherein a first temperature sensor is associated with a first of the at least two sensor elements and a second temperature sensor is associated with a second of the at least two sensor elements.

10. The sensor system of claim 1, wherein the compensation circuitry comprises at least one temperature sensor, and wherein the compensation factor is based in part on an output of the at least one temperature sensor.

11. The sensor system of claim 1, wherein the sensor system is a differential Hall sensor system.

12. The sensor system of claim 1, wherein the sensor system is a differential sensor system.

13. The sensor system of claim 1, wherein the sensor system is a pressure sensor system.

14. A stress compensation method for a sensor comprising:
   determining a compensation factor that is a function of a difference in mechanical stress between at least two sensor elements of the sensor, wherein the at least two sensor elements are used to detect the difference in mechanical stress; and
   compensating for a mechanical stress sensitivity mismatch between the at least two sensor elements by adjusting a difference in output signals of the at least two sensor elements by the compensation factor.

15. The method of claim 14, wherein the difference in mechanical stress between the at least two sensor elements is estimated from a difference in the supply voltages of the at least two sensor elements.

16. The method of claim 14, wherein determining a compensation factor further comprises utilizing at least one temperature sensor.

17. The method of claim 16, wherein utilizing at least one temperature sensor further comprises utilizing a first temperature sensor with a first one of the at least two sensor elements and utilizing a second temperature sensor with a second one of the at least two sensor elements.

18. The method of claim 14, wherein the sensor is a differential Hall sensor.

19. The method of claim 14, wherein the sensor is a differential sensor.

20. The method of claim 14, wherein the sensor is a pressure sensor.

* * * * *